June 7, 1938.  E. C. MacDONALD  2,119,590
METHOD OF MAKING CASTS OF FEET
Filed March 6, 1936
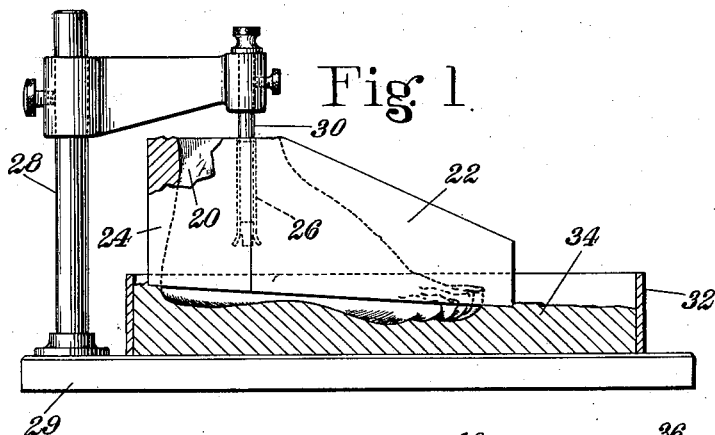
Fig. 1
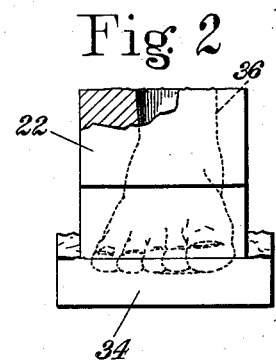
Fig. 2
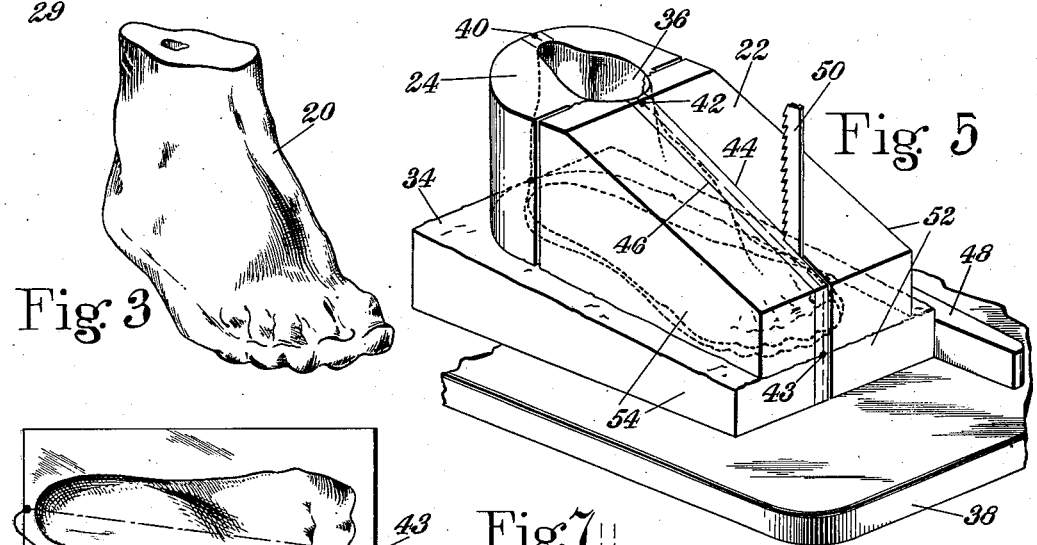
Fig. 3
Fig. 5
Fig. 4
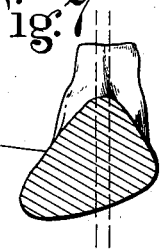
Fig. 7
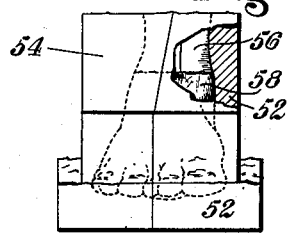
Fig. 6
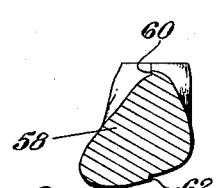
Fig. 8
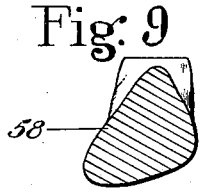
Fig. 9
INVENTOR:
Edwin C. MacDonald
By his Attorney,
Harlow M. Davis

UNITED STATES PATENT OFFICE 2,119,590

METHOD OF MAKING CASTS OF FEET

Edwin C. MacDonald, Randolph, Mass., assignor to United Shoe Machinery Corporation, Paterson, N. J., a corporation of New Jersey Application March 6, 1936, Serial No. 67,524

2 Claims. (Cl. 18—55)

The invention relates to casts and methods of making casts and is illustrated herein by way of example with reference to the making of casts of animate objects such as human feet.

An object of the invention is to provide an improved method of making casts of objects in the practice of which a cast may be produced which is smaller than the object from which it was made in any required measurement but which will nevertheless retain the essential details of the surface configurations of said object.

To this end the invention provides, in accordance with one aspect, an improved method of obtaining an impression of an object of which a reduced cast is to be made which comprises forming a mold of the object and removing a section or layer from the mold, for example by cutting a kerf or kerfs through the mold so that when the mold sections are brought together the size of the impression will have been reduced. The reduced mold is then utilized to form a cast which is reduced in accordance with the reduction of the mold but which, except for the removed portion, retains the shape of the original object. As illustrated herein, the layer is removed by splitting the mold into two sections on a line located a measured distance laterally of a plane extending substantially at right angles to the direction of intended reduction, this plane being itself located in the intermediate portion of a relatively symmetrical portion of the impression in the mold, and then removing a layer by a second cut located the same distance the other side of said plane or a kerf of the entire thickness of the layer to be removed may be cut in the most symmetrical portion of the impression in the mold and the resulting mold sections may then be reassembled with the cut surfaces in contact to bring the remaining portions of the impression into substantial alinement or registration with each other.

A cast made in such a mold will retain the surface configurations of the original object except for those portions removed as related above and will, at the same time, retain the dimensions of the original object in directions other than that in which the reduction was made. If the cast was narrowed, for instance, it will retain substantially the height of the original object and its original length but will be reduced in width and, therefore, in girth, amounts corresponding to the thickness of the material removed. This thickness may be such as may reduce the cast uniformly with respect to the original object or it may, if desired, reduce the cast more at one portion than at another, for example, by taking out a wedge-shaped portion. The same principles apply, of course, in forming a reduced cast which is smaller than the original object in directions other than widthwise, for example lengthwise, heightwise, or at different angles and it is obviously within the scope of the invention to form a cast which is reduced in two or more directions at the same time.

With the above and other objects and aspects in view, the invention will now be described in connection with the accompanying drawing and thereafter pointed out in the claims.

In the drawing,

Fig. 1 is a side elevation, partly in section, illustrating the making of a mold from a cast of a foot;

Fig. 2 is an end elevation of a completed multi-part mold with a portion broken away;

Fig. 3 is a perspective view of a full-sized cast of a foot;

Fig. 4 is a plan view of the lower part of the multi-part mold;

Fig. 5 is a perspective view illustrating the multi-part mold being split into sections in a predetermined plane;

Fig. 6 is an end view of the mold sections reassembled after the removal of material from their central portion by cutting a saw-kerf through the mold;

Fig. 7 is a transverse sectional view through the forepart of the cast shown in Fig. 3;

Fig. 8 is a transverse sectional view through the forepart of a cast made in the reduced mold of Fig. 6; and Fig. 9 shows the cast of Fig. 8 after the irregularities have been removed therefrom.

The method of making reduced casts of animate objects illustrated herein involves first the production of a full-sized cast of the object, for example, a foot, when the latter is located in a predetermined position which it is desired to maintain in the reduced cast as, for example, when a foot is located in the position it is to assume in a finished shoe when supporting the weight of the body. Although not limited thereto, the present method is particularly adapted for reducing casts of feet which have been formed in accordance with the method disclosed in an application for Letters Patent of the United States Serial No. 4,740, filed February 4, 1935, in the name of Clifford K. MacDonald. In the application referred to, the foot of which a cast is to be made is pressed under the weight of the body into a molding device comprising a plurality of small magnetizable particles or balls mounted on a support and adapted to receive an impression of the lower portion of the foot after which the particles are rendered immobile by an electromagnet, this device being fully disclosed and claimed in Letters Patent No. 2,057,039, granted October 13, 1936, on an application filed in the name of Clifford K. MacDonald.

The mold for forming the upper portion of the cast in the application last mentioned comprises a pair of hoods which are arranged to surround the forepart and heel portions of the foot while resting on the magnetizable particles. With the foot in the position it should assume in a finished shoe and supporting the weight of the body, a mold of plastic material is cast in the hoods after which the foot is removed by separating the upper mold members on dividing lines provided therein. The parts of the mold are relocated on the magnetized particles to form a complete impression of the foot in the desired position and a cast of the foot is made in this impression. A ferrule or bushing preferably of metal is located at the heel portion of the mold in a predetermined position relatively to the bottom surface of the cast before the latter has set. Later on in carrying out the method of the first-mentioned application the cast may be re-located by this ferrule in exactly the same position as that in which it was made.

It should be understood that the present method is not only adapted for operating on casts of the character just described but can also be utilized in operating on casts produced by other methods or on casts of other objects besides human feet. Moreover, it is within the scope of the invention to form a mold of the object itself in the first instance and, by following out the steps hereinafter to be described, to produce a reduced cast of the object which will conform substantially to the surface configurations of the object. Accordingly, the disclosure of the present method in connection with casts of feet produced by the method of the MacDonald application Serial No. 4,740, is by way of example only, and should not be regarded as limiting the method in any way.

After the removal of the cast from the magnetic molding apparatus previously referred to it will have the upper mold members adhering to its upper portions. Such a cast 20 of a foot having an upper mold member 22 adhering to the upper part of its toe portion and a mold 24 adhering to its heel portion is illustrated in Fig. 1 as mounted by means of a ferrule or bushing 26 on a downwardly extending rod 30 carried by a supporting member 28 mounted on a table 29 so that the cast is held substantially rigid with its lower surface spaced a short distance from the table. A molding box 32 is placed around the lower portion of the cast and plastic material, for example plaster of Paris or the like, is introduced into the molding box (as shown in Fig. 1) to form a lower mold 34. Fig. 2 is an end elevation looking from the right in Fig. 1 and showing the upper mold member 22 and the lower mold member 34, the complete impression of the cast 20 being indicated by dotted lines 36. Fig. 3 is a perspective view of the original cast 20 which has been removed from the mold members illustrated in Figs. 1 and 2 and shows more clearly the size and shape of the cast.

The cast 20 is examined to find an area of substantial width near its central or median portion which is more symmetrical throughout its entire length than adjacent portions and the assembled mold 22, 24, and 34 is marked at 40, 42 and 43 to indicate a plane substantially central of that portion. It should be noted that the indicated plane need not always be at right angles to the horizontal as illustrated in the present case.

With the plane determined by the points 40, 42 and 43 as a guide, lines are marked off on the outer surfaces of the assembled mold as indicated at 44, 46, the positions of these lines laterally of the original plane being determined by the amount it is desired to reduce the cast widthwise. Since the girth measurement of the cast 20 in any given transverse plane will be reduced approximately twice the amount of the distance between the lines 44, 46, this distance should be only about half the amount of the required girth reduction or, in other words, these lines should be located laterally of the predetermined plane about one-quarter of the distance of the desired reduction.

After the assembled mold has been marked in the manner indicated, one side of the lower mold 34 is placed against a gage or straight edge 48 adjustably secured to the table 38 and the mold is split into two sections along one of the lines 44, 46 by a saw 50, preferably a band saw passing through a slot (not shown) in the table 38, thereby dividing the assembled mold into the sections 52, 54 on a plane substantially parallel to the plane originally indicated by the points 40, 42 and 43 and substantially at right angles to the direction of the desired reduction. The section of the assembled mold which still contains the marks 40, 42 and 43 is now placed against the straight edge 48 and a layer of material the width of the space between the lines 44, 46 is removed from the side thereof which contains the impression. In the present case the layer of material which is removed from the central portion of the assembled mold will be of substantially uniform thickness throughout although, of course, if it is desired to reduce the width of the final cast more at one portion than another longitudinally, the saw cuts could be at such an angle to each other by adjustment of the gage 48 as would produce the proper result. It will be observed that the layer of material determined by parallel planes passing through the lines 44, 46, intersects the impression 36 in the assembled mold and removes therefrom a portion of substantial width. When the reduced sections of the assembled molds are brought together again as shown in Fig. 6, the remaining portions of the impression 36 will substantially register with each other to form a complete impression 56 which is narrower than the original impression by the thickness of the material removed from the central portion of the assembled molds. By using a saw of a suitable width, the entire reduction may be accomplished by cutting a single kerf from end to end of the mold.

The final steps of the method comprise utilizing the assembled mold sections 52, 54 to form a new cast 58 by pouring plastic material into the mold up to the desired height in the reduced impression 56. Fig. 8 is a transverse section of the cast 58 made in the reduced mold and shows the difference in width through the forepart of the cast as compared with the transverse section of the original cast shown in Fig. 7. The cast of Fig. 8 will retain all the original surface configurations of the original cast except those contained on the layer of material which was removed from the central portion of the mold. Since the mold sections, when reassembled as shown in Fig. 6, will probably not bring the remaining portions of the original impression 36 into exact alinement with each other, any small projections or shoulders thereon such as those shown at 60, 62 in Fig. 8 may be removed by adding plastic material and smoothing by hand. Fig. 9 is a transverse section of the reduced cast 58 after the shoulders have been eliminated in the manner described.

Although the invention is illustrated herein with reference to making a cast of a foot narrower than a cast made directly from the foot to reduce the girth measurements of the cast, it will be obvious that a cast of a foot or casts of other objects could not only be made narrower in the manner described but could also be reduced heightwise, lengthwise, or in some other direction. If it should be desired to reduce the cast different amounts in any particular direction, the strip of material which is removed from that portion of the assembled molds which contains the relatively symmetrical portion of the impression can, as pointed out above, be tapered or otherwise altered to produce the desired results. Furthermore, the reduction may be accomplished by removing two or more layers of material spaced from each other and either parallel or inclined to each other.

Having described my invention, what I claim as new and desire to secure by Letters Patent of the United States is:

1. That improvement in methods of making casts of feet which comprises making a mold of a foot to obtain an impression thereof, cutting the mold in a median plane extending lengthwise and heightwise of the mold and thereby separating the mold into two parts approximately symmetrical with respect to the plane and each containing a portion of the impression, removing from the cut surface of one or both of said parts a layer of material which reduces the width of the impression without otherwise appreciably altering its shape, reassembling the two parts of the mold, thereby reconstructing an impression which is narrower than the original foot but retains most of its surface configurations, and making in the reassembled mold a cast which contains said surface configurations but is narrower than the original foot.

2. That improvement in methods of making casts of feet which comprises making a mold of a foot to obtain an impression thereof, cutting and removing material from the mold in a median plane extending lengthwise and heightwise of the mold and thereby dividing it into two relatively symmetrical parts, thus reducing its width without appreciably altering its surface contour, reassembling the mold to reestablish the reduced impression, and producing in said mold a cast of the foot which contains substantially all of the surface contours of the original foot but is narrower than said foot.

EDWIN C. MACDONALD.